US010935624B2

(12) United States Patent
Zarubica et al.

(10) Patent No.: US 10,935,624 B2
(45) Date of Patent: Mar. 2, 2021

(54) EFFICIENTLY MEASURING PHASE DIFFERENCES IN AN ANGLE OF ARRIVAL SYSTEM

(71) Applicant: L3 Technologies, Inc., New York, NY (US)

(72) Inventors: Radivoje Zarubica, Salt Lake City, UT (US); Samuel C. Kingston, Salt Lake City, UT (US); Larry S. Thomson, Salt Lake City, UT (US); Scott N. Adamson, Salt Lake City, UT (US); Edwin R. Twitchell, Salt Lake City, UT (US); Zachary C. Bagley, Salt Lake City, UT (US)

(73) Assignee: L3 Technologies, Inc., New York, NY (US)

( * ) Notice: Subject to any disclaimer, the term of this patent is extended or adjusted under 35 U.S.C. 154(b) by 497 days.

(21) Appl. No.: 15/940,817

(22) Filed: Mar. 29, 2018

(65) Prior Publication Data

US 2019/0302218 A1  Oct. 3, 2019

(51) Int. Cl.
| | | |
|---|---|---|
| *G01S 5/04* | (2006.01) | |
| *G01S 3/48* | (2006.01) | |
| *G01S 3/04* | (2006.01) | |
| *G01S 3/46* | (2006.01) | |
| *H01Q 21/00* | (2006.01) | |

(Continued)

(52) U.S. Cl.
CPC ............... *G01S 3/48* (2013.01); *G01S 3/043* (2013.01); *G01S 3/46* (2013.01); *G01S 3/72* (2013.01); *G01S 3/74* (2013.01); *H01Q 21/00* (2013.01); *H04L 7/0008* (2013.01)

(58) Field of Classification Search
CPC .......... G01S 19/35; G01S 19/36; G01S 19/37; G01S 3/48; G01S 3/02; G01S 3/043; G01S 3/46; G01S 3/72; G01S 3/74; H04L 7/0008
USPC ......... 342/442, 357.75, 357.76, 357.77, 417, 342/445
See application file for complete search history.

(56) References Cited

U.S. PATENT DOCUMENTS

| 6,073,032 A | * | 6/2000 | Keskitalo | ............... H04B 7/086 455/561 |
| 6,345,188 B1 | * | 2/2002 | Keskitalo | ................. H04B 7/10 455/561 |

(Continued)

*Primary Examiner* — Chuong P Nguyen
(74) *Attorney, Agent, or Firm* — Kirton McConkie; Brian Tucker

(57) ABSTRACT

An angle of arrival system is configured to efficiently measure phase differences. The angle of arrival system includes a master receiver for demodulating the signal received at one antenna and for implementing a tracking loop to identify the timing of symbols within the signal. This timing information can be fed back as a synchronization signal to a despreader in the master receiver and to a despreader in each of a number of slave receivers to synchronize the timing at which each signal is despread. Because despreading is synchronized, the outputs of the despreaders can be used to directly calculate phase differences between each pair of signals. In this way, the slave receivers do not need to implement a demodulator or a tracking loop. When the received signal is a non-spread signal, the phase differences between each pair of signals can be calculated directly from the modulated samples of each pair of signals without despreading.

22 Claims, 4 Drawing Sheets

(51) Int. Cl.
*H04L 7/00* (2006.01)
*G01S 3/74* (2006.01)
*G01S 3/72* (2006.01)

(56) References Cited

U.S. PATENT DOCUMENTS

| | | | | |
|---|---|---|---|---|
| 6,618,010 | B2* | 9/2003 | Arndt | G01S 3/46 |
| | | | | 342/442 |
| 7,847,733 | B2* | 12/2010 | Shirakawa | G01S 3/74 |
| | | | | 342/417 |
| 10,324,158 | B2* | 6/2019 | Wang | G01S 3/043 |
| 10,505,620 | B2* | 12/2019 | Ito | H04B 17/364 |
| 10,594,517 | B1* | 3/2020 | Lo | H04L 25/0242 |
| 2003/0210670 | A1* | 11/2003 | kisigami | H04B 1/7113 |
| | | | | 370/335 |
| 2005/0250564 | A1* | 11/2005 | Kishigami | G01S 3/043 |
| | | | | 455/575.7 |
| 2007/0054623 | A1* | 3/2007 | Sato | H04B 7/0617 |
| | | | | 455/67.11 |
| 2010/0090900 | A1* | 4/2010 | Mitsumoto | G01S 13/34 |
| | | | | 342/417 |
| 2017/0102445 | A1* | 4/2017 | Mesecher | H01Q 3/2629 |
| 2017/0338900 | A1* | 11/2017 | Shimbo | H04B 7/086 |
| 2020/0011956 | A1* | 1/2020 | Zarubica | G01S 3/12 |

* cited by examiner

EFFICIENTLY MEASURING PHASE DIFFERENCES IN AN ANGLE OF ARRIVAL SYSTEM

CROSS-REFERENCE TO RELATED APPLICATIONS

N/A

BACKGROUND

Geolocation refers to techniques for determining the geographic location of an object. Various types of geolocation exist. The present invention is applicable to environments where the object to be geolocated emits a signal. In such environments, various measurements can be performed on the received signal to estimate the location of the emitting object. For example, a receiver can perform angle (or direction) of arrival techniques to estimate the angle between the emitting object and the boresight vector of the receiver's antennas.

Angle of arrival techniques are often performed by detecting phase differences at a number of antennas that receive the signal emitted by the object. In such systems, each antenna is coupled to a receiver that is configured to detect the phase of the signal received at the corresponding antenna. To accomplish this phase detection, each receiver implements a tracking loop to produce an output indicative of the phase. These outputs can then be compared to identify the phase differences between the signals received at each pair of antennas.

Various issues exist with such techniques. For example, because the phase of each received signal is detected, a "full" receiver—i.e., one that demodulates the signal and implements a tracking loop to detect the phase of the received signal—is required for each antenna. In angle of arrival systems that employ many antennas, implementing a full receiver for each antenna significantly increases the system's complexity. Also, tracking loops could slip and therefore, to implement a reliable system, a mechanism for detecting and correcting cycle slips is required which further increases the complexity of the system. Additionally, tracking loops are typically configured to maintain link in a worst case scenario. As a result, the tracking loop performs little averaging which reduces the overall accuracy of the angle of arrival measurements.

BRIEF SUMMARY

The present invention extends to an angle of arrival system that is configured to efficiently measure phase differences. The angle of arrival system includes a master receiver for demodulating the signal received at one antenna and for implementing a tracking loop to identify the timing of symbols within the signal. This timing information can be fed back as a synchronization signal to a despreader in the master receiver and to a despreader in each of a number of slave receivers to synchronize the timing at which each signal is despread. Because despreading is synchronized, the outputs of the despreaders can be used to directly calculate phase differences between each pair of signals. In this way, the slave receivers do not need to implement a demodulator or a tracking loop.

Because a single master receiver is employed, the overall complexity of the angle of arrival system is greatly reduced. Additionally, because phase difference is measured directly, as opposed to first determining the phases and calculating the differences between the determined phases, the phase differences are less susceptible to variations in the performance of the angle of arrival system.

In one embodiment, the present invention is implemented by an angle of arrival system as a method for identifying an angle of arrival of a signal incident on an antenna array by employing phase differences between the signal when the signal is received at multiple antennas of the antenna array. The signal received at each of the multiple antennas of the antenna array is processed through a corresponding channel. Each channel includes a despreader. In a first channel of the multiple channels, the corresponding signal is demodulated and tracked to generate a synchronization signal which identifies the timing of symbols within the corresponding signal. The synchronization signal is provided to the despreader in the first channel and to the despreader in each of the other channels to thereby cause each despreader in each of the multiple channels to synchronously despread the corresponding signal. A covariance matrix is generated from the despread signals output from the despreaders. An angle of arrival of the signal is calculated using the covariance matrix.

In another embodiment, the present invention is implemented as an angle of arrival system that includes: a first channel for processing a signal received at a first antenna in an antenna array, the first channel including a despreader, a demodulator, and a tracking loop, the tracking loop outputting a synchronization signal that identifies timing of symbols within the signal, the synchronization signal being provided to the despreader to control timing of the despreader; multiple additional channels for processing the signal received at each of multiple additional antennas in the antenna array, each additional channel including a despreader, the synchronization signal being provided to the despreader in each of the additional channels to control timing of the despreader; and a covariance matrix component configured to receive the despread signals output from the despreader in each of the channels and to generate phase differences between each pair of despread signals.

In another embodiment, the present invention is implemented as an integrated circuit that includes: a first despreader and multiple additional despreaders, each despreader being configured to despread a signal that was received at a different antenna of an antenna array; a demodulator for demodulating the signal output by the first despreader; a tracking loop coupled to the demodulator, the tracking loop generating a synchronization signal which identifies timing of symbols within the signal processed by the first despreader; and a covariance matrix component that is configured to receive the signals output by each of the despreaders and to calculate phase differences between each pair of the signals. The synchronization signal is provided to the first despreader and to each of the multiple additional despreaders to synchronize the timing at which each despreader dispreads the corresponding signal.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

Understanding that these drawings depict only typical embodiments of the invention and are not therefore to be considered limiting of its scope, the invention will be described and explained with additional specificity and detail through the use of the accompanying drawings in which.

DETAILED DESCRIPTION

In this specification, the term "master receiver" or "full receiver" will be used to refer to a receiver that includes components for despreading and demodulating a signal. In contrast, the term "slave receiver" will be used to refer to a receiver that includes components for despreading a signal, but does not include (or does not employ) components for demodulating the signal. An angle of arrival system configured in accordance with embodiments of the present invention includes a master receiver and multiple slave receivers.

Figure 1:
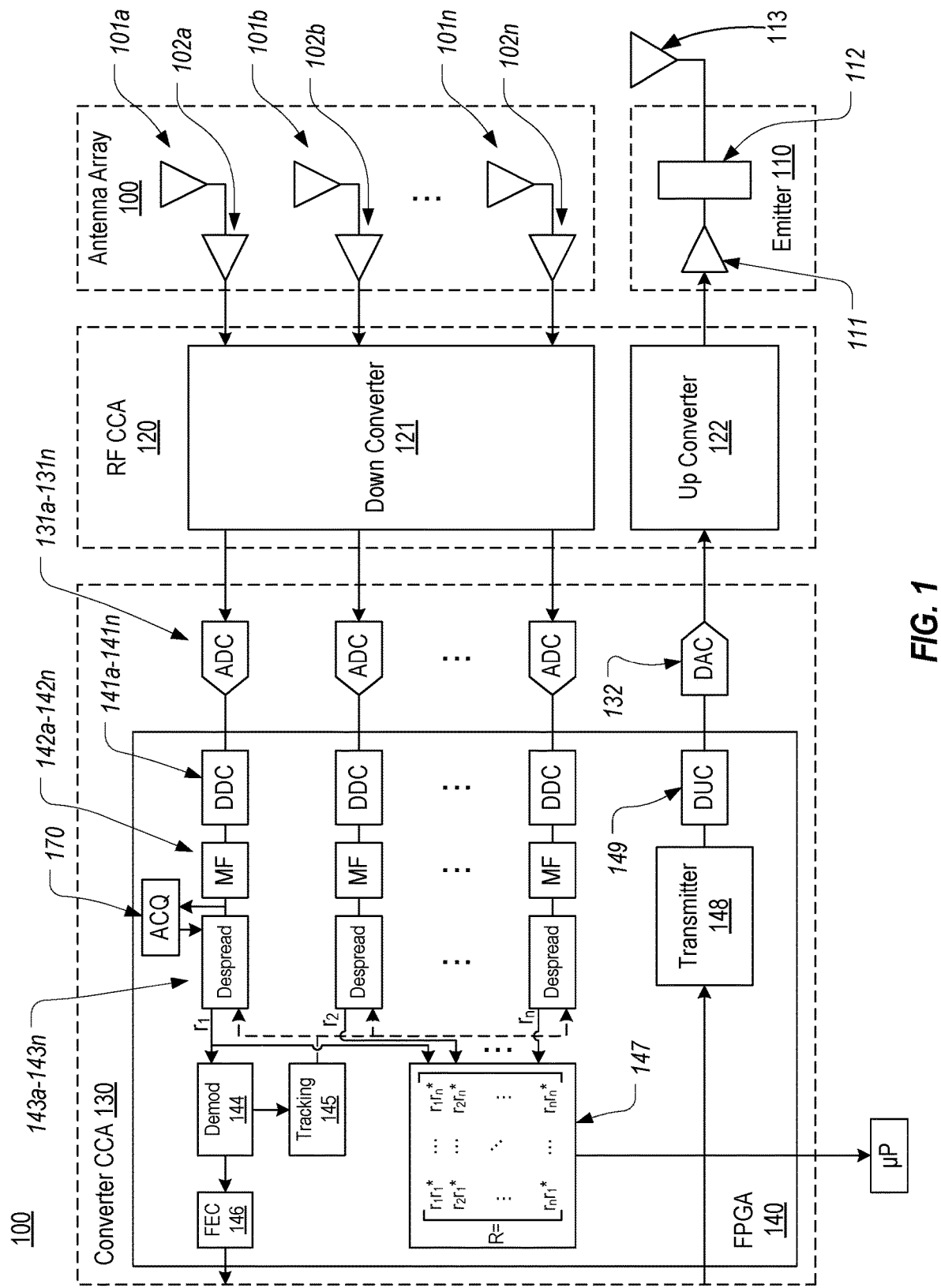
FIG. 1 provides a block diagram of an angle of arrival system that is configured in accordance with embodiments of the present invention.

FIG. 1 generally illustrates the architecture of an angle of arrival system 100 that is configured in accordance with embodiments of the present invention. Angle of arrival system 100 includes the following general components: an antenna array 100, an emitter 110, a radio frequency (RF) circuit card assembly (CCA) 120, and a converter CCA 130. Each of these components is represented in dashed lines to indicate that the components may be incorporated into or implemented on the same structure or one or more different structures. The depicted division of these components is therefore for illustrative purposes only.

Antenna array 100 includes multiple antennas 101a-101n (where n represents some integer greater than one) and a corresponding number of low noise amplifiers (LNAs) 102a-102n. For purposes of illustration, it will be assumed in the remainder of this description that n equals eight such that eight channels are implemented within angle of arrival system 100 to process the received signal. Antennas 101a-101n could be oriented in any arrangement suitable for performing angle of arrival techniques. As is known, the location of an emitting object can be determined using angle of arrival techniques by calculating the differences in the phases of the signal emitted by the object when the signal is received at each of antennas 101a-101n. In particular, when the object is at an angle offset from the boresight vector of antenna array 100, the signal will be received at slightly different times (due to the different distances between the object and the particular antenna) resulting in different phases.

As will be described more fully below, the signal that is received at antenna array 100 may be a spread signal that has been spread using a phase modulated spread code or another type of spread code. By spreading the signal, the object whose location is being detected can transmit the signal covertly below the noise floor (i.e., as a low probability of intercept/low probability of detection (LPI/LPD) signal). LNAs 102a-102n can perform their typical function to amplify the signal received at each antenna 101a-101n.

The output of each LNA 102a-102n can be provided to a down converter 121 of RF CCA 120. Down converter 121 can convert each signal to a lower frequency that is suitable for subsequent processing by the components of converter CCA 130. It is noted that, in some embodiments, the frequency of the received signal may be low enough to be provided directly to converter CCA 130 such that down converter 121 would not be necessary.

Regardless of whether the signals are down converted, they can be provided to corresponding analog-to-digital converters (ADCs) 131a-131n which are shown as being components of converter CCA 130. It is again noted, however, that ADCs 131a-131n could be incorporated into RF CCA 120 or into another component. Each of ADCs 131a-131n outputs digital samples of the respective analog signals.

The digital samples produced by ADCs 131a-131n are input to FPGA 140. Specifically, digital down converters 141a-141n can be implemented in FPGA 140 to down convert the digital samples to a lower frequency and/or sampling rate. At this point, a sequence of digital samples will exist in each channel with each sequence representing the same received signal shifted by some amount (assuming the signal is received at some angle off boresight). These sequences are then processed through matched filters 142a-142n to maximize power transfer.

Despreaders 143a-143n can employ the known spread code to despread the signal. A course acquisition component 170 can be implemented to provide timing information to one of the despreaders, which in this case is despreader 143a. This timing information is not precise, and therefore, the despreading may not be performed at the correct time. It is due to this imprecision that a full receiver implements a tracking loop.

Accordingly, for one of the channels, a full receiver can be implemented. As shown in FIG. 1, the output of despreader 143a, identified as $r_1$, is provided to demodulator 144 which demodulates the signal. In some embodiments, the demodulated signal can be provided to a forward error correction (FEC) component 146 and then output for further processing although such processing is not necessary for angle of arrival purposes.

A tracking loop 145 is also implemented on the $r_1$ channel to perform fine synchronization of the spread code. For example, tracking loop 145 could be in the form of a delay-locked loop (DLL) or a phase-locked loop (PLL) which can output a synchronization signal that is provided back to despreader 143a. This synchronization signal precisely identifies the timing of the symbols in the received signal to thereby allow despreader 143a to perform despreading with high precision. In other words, the synchronization signal will define when a particular symbol starts and when the particular symbol stops in the received signal.

Additionally, this synchronization signal output by tracking loop 145 is provided back to each of despreaders 143b-143n for the same purpose. Accordingly, the $r_1$ channel implements a master (or full) receiver to produce a synchronization signal that is used to control the timing of the remaining despreaders 142b-143n. As such, the $r_2$ through $r_n$ channels can be viewed as implementing slave receivers since they do not implement (or at least do not use) their own demodulators or tracking loops. Instead, the timing of despreading is synchronized across each of despreaders 143a-143n based on the output of tracking loop 145 in the $r_1$ channel. Accordingly, tracking loop 145 determines when a symbol starts in the received signal being processed through the $r_1$ channel and synchronizes the operation of despreaders 143b-143n to this timing.

Due to this synchronization, the modulated outputs, $r_1$ through $r_n$, of each of despreaders 143a-143n, can be fed directly to a covariance matrix component 147 which employs conjugate multiplication on corresponding samples to generate a covariance matrix that identifies the differences in phase between each channel. Notably, each of the $r_1$ through $r_n$ signals is still modulated and therefore does not identify the actual phase of the signal. The actual phase of the signal received at antenna 101a is not identified until the $r_1$ signal has been demodulated and processed through tracking loop 145. On the other hand, the actual phase of the signals received at antennas 101b-101n is never directly identified. However, by synchronizing the despreading across each channel using a master receiver, the phase differences between each channel can be still be extracted without demodulating the $r_2$ through $r_n$ signals.

Figure 2:
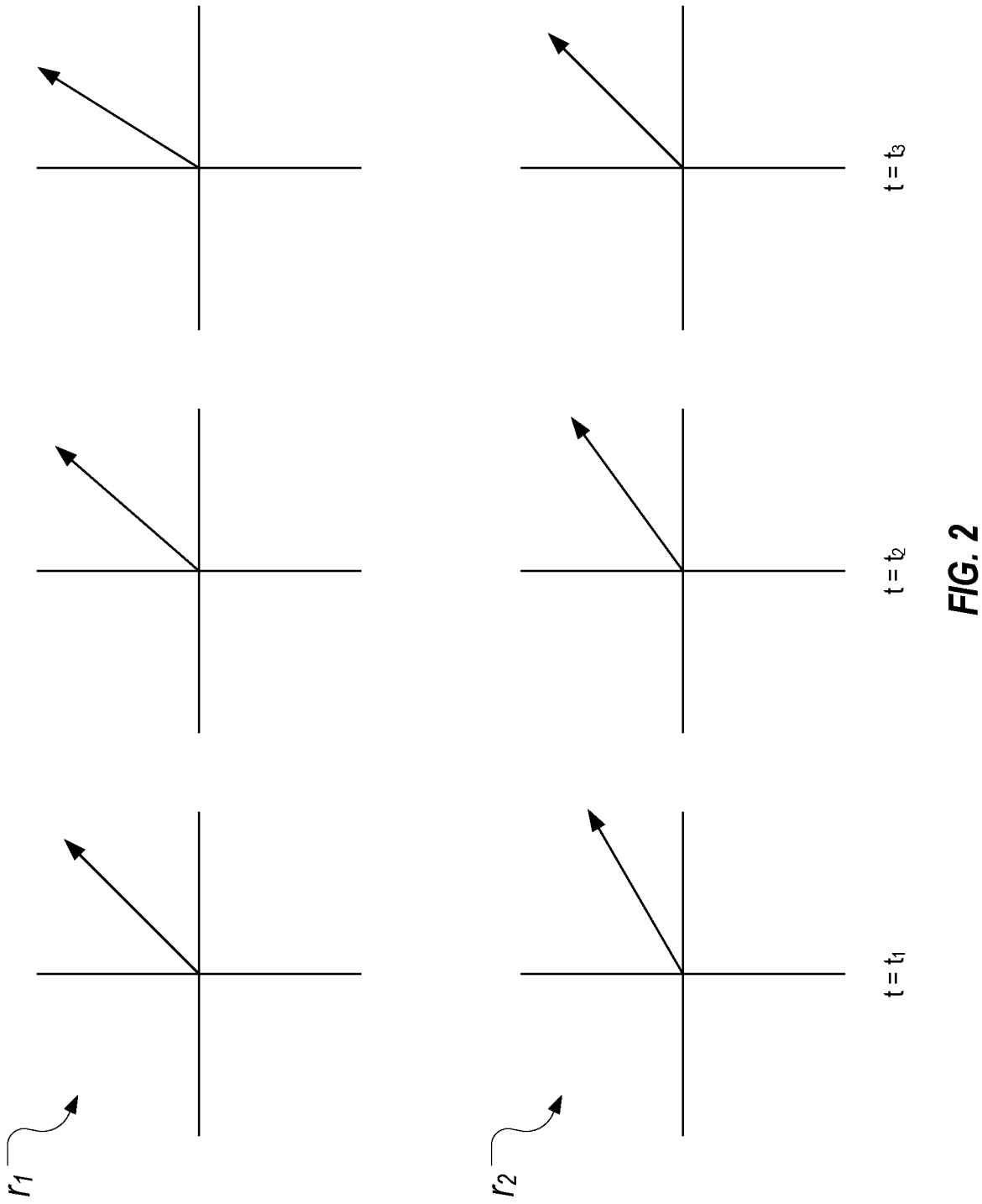
FIG. 2 illustrates examples of corresponding samples of modulated signals that are processed through two channels of an angle of arrival system.

FIG. 2 provides an example of how this master/slave technique allows the phase differences to be determined. FIG. 2 depicts the magnitude and phase of the $r_1$ and $r_2$ signals at three samples taken at times $t_1$, $t_2$, and $t_3$. The synchronization of despreaders 143a-143n ensures that the samples at each of these times fall within the same symbol. As shown, there is a small variation between the phases of the $r_1$ and $r_2$ signals at each of these times. Such a variation would occur when the distance between the object emitting the signal and antennas 101a and 101b is different. In this example, it is assumed that the phase of the $r_1$ signal trails the phase of the $r_2$ signal by about 12°. This difference can be directly calculated from the modulated $r_1$ and $r_2$ signals as $r_1 r_2^*$ where * represents the conjugate. Similar calculations can be performed between each pair of signals to thereby determine the phase difference between the signals received at each pair of antennas 101a-101n. To increase the accuracy of the phase difference calculation, averaging can be performed over multiple samples. For example, the average of the phase difference between the $r_1$ and $r_2$ samples taken at times $t_1$ through $t_3$ can be determined.

Once the covariance matrix has been calculated, and preferably after averaging the covariance matrix values over a period of time, covariance matrix component 147 can output the covariance matrix values to a microprocessor (pP) which can efficiently calculate an estimate of the angle of arrival of the emitted signal. The microprocessor (pP) can generate and update the estimate based on the (averaged) values of the covariance matrix received from covariance matrix component 147 and the known relative locations of antennas 101a-101n. Although this calculation of the angle of arrival is shown as being performed in a separate microprocessor, it could equally be performed within FPGA 140 or in any other suitable circuitry.

Although not essential to the present invention, angle of arrival system 100 may also include a transmission path defined by transmitter 148, digital up converter (DUC) 149, digital-to-analog convert (DAC) 132, up converter 122, power amplifier 111, filter 112 and antenna 113. An angle of arrival system may include this transmission path to enable it to also be used as an emitter so that angle of arrival techniques can be performed at another similarly configured node. For example, an aircraft, vehicle, or any other object whose location is to be tracked can be equipped with an angle of arrival system 100 configured to operate in transmit mode while an aircraft carrier, building, or another structure can be equipped with another angle of arrival system 100 configured to operate in receive mode.

To summarize, conventional angle of arrival systems implement a full receiver on each channel to demodulate and identify the phase of the received signal prior to calculating the phase differences between signals. The present invention, in contrast, employs a single master receiver to determine the timing of symbols in the received signal being processed through one channel and then synchronizes the despreading of the signal in each channel based on this timing. In this way, the present invention enables an angle of arrival system to have reduced complexity. By omitting tracking loops from all but the master receiver, the present invention also avoids the difficulties/complexities caused by cycle slipping within the tracking loop and facilitates averaging phase differences over a number of samples.

To this point, it has been assumed that the signals are synchronized when they reach despreaders 143a-143n. In practice, however, each channel will exhibit a different delay which will likely cause the signals to be out of sync at despreaders 143a-143n. For example, differences in cable lengths used to connect the components of antenna array 100, RF CCA 120 and converter CCA 130 as well as variations in group delay may cause the various signals to be misaligned by the time they reach ADCs 131a-131n. Also, each of ADCs 131a-131n will likely introduce a different phase error into the digital samples (e.g., due to variations in the length of the traces that apply the clock to each ADC thereby causing each ADC to sample the corresponding signal at a slightly different time). As a result, the digital samples input to FPGA 140 for each channel will likely be misaligned. In other words, the phase differences between signals as they enter FPGA 140 will not accurately represent the phase differences that existed between the signals as they reached antennas 101a-101n which would introduce errors into the phase differences calculations.

Figure 3:
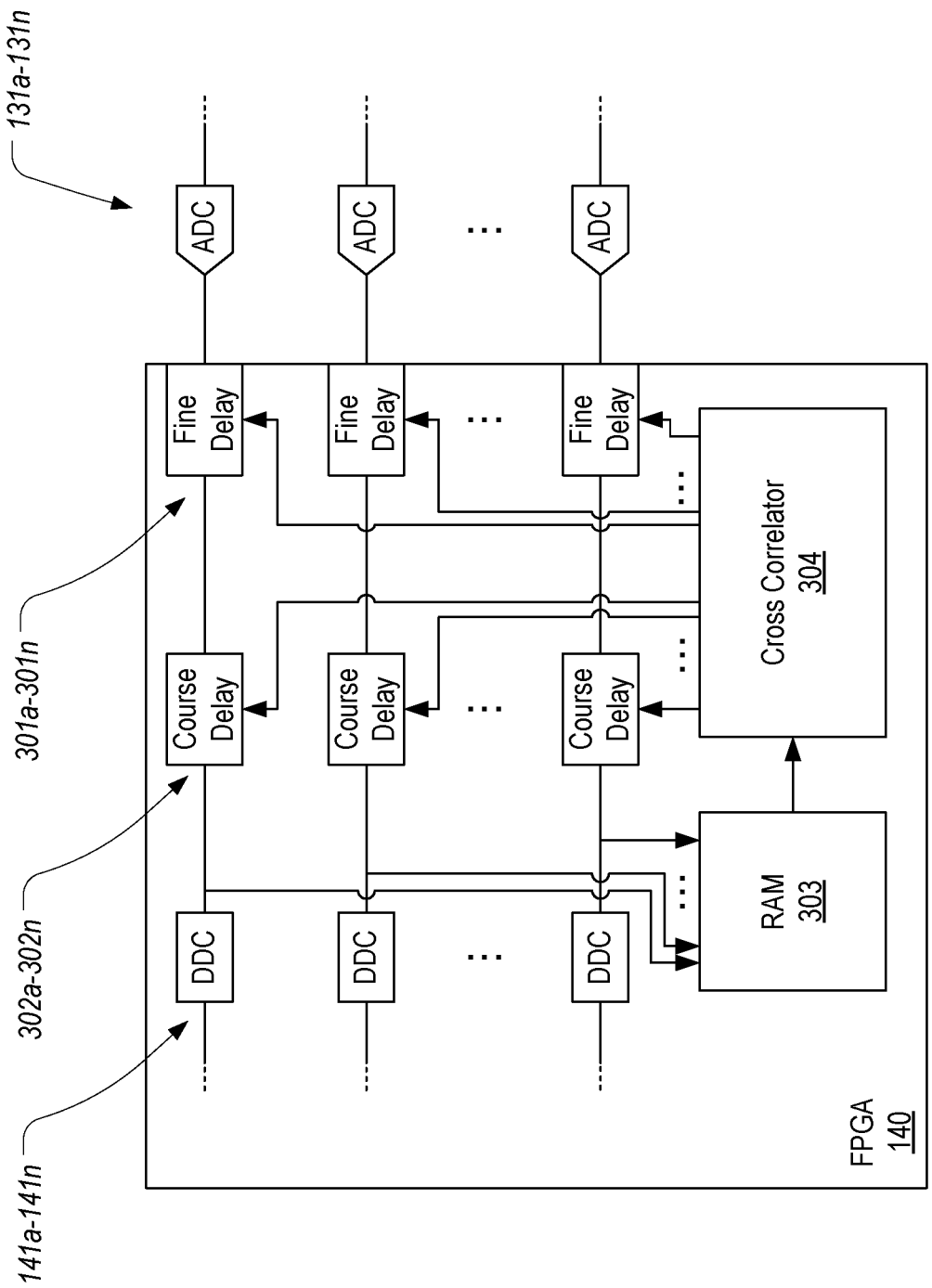
FIG. 3 provides a block diagram of a portion of the angle of arrival system of FIG. 1.

To address these misalignment issues, additional components can be implemented within FPGA 140 to identify and apply an appropriate delay to each channel so that each of the signals is synchronized at despreaders 143a-143n. FIG. 3 illustrates an example of FPGA 140 with these additional components.

In FIG. 3, FPGA 140 includes a fine delay component 301a-301n and a course delay component 302a-302n for each of the n channels. In some embodiments, fine delay components 301a-301n can be components provided in FPGA 140 at the I/O boundary and course delay components 302a-302n can be programmed (e.g., using VHDL). In any case, both fine delay components 301a-301n and course delay components 302a-302n are programmable to apply a specified amount of delay to the corresponding signal as it passes through the channel towards the corresponding DDC 141a-141n. Typically, fine delay components 301a-301n provide picosecond resolution while course delay components 302a-302n can provide for greater delays as necessary.

To determine the amount of delay that each of fine delay components 301a-301n and course delay components 302a-302n should apply, the digital samples of the signals that are input to DDCs 141a-141n can be captured in RAM 303 over a period of time. This period of time could be at startup as part of initializing angle of arrival system 100 or at any other time when it may be desirable to resynchronize the channels. The purpose of capturing samples over a period of time is to allow a cross correlator 304 to perform a cross-correlation (or sliding dot product) on the series of samples for pairs of channels. This cross-correlation will yield a peak when the two spread signals are aligned. The amount of the shift required to create this peak will define the relative delay between the two signals.

In conjunction with calculating the relative delay between the pairs of signals, cross correlator 304 can output control signals to fine delay components 301a-301n and/or to course delay components 302a-302n as required to delay each signal by an amount that will cause all signals to be aligned. As mentioned above, this alignment may be performed once at startup to ensure that the signals are synchronized upon reaching despreaders 143a-143n. In some embodiments, additional alignments may be performed manually or automatically to account for any changes in delay caused by operating conditions or other factors.

Figure 4:
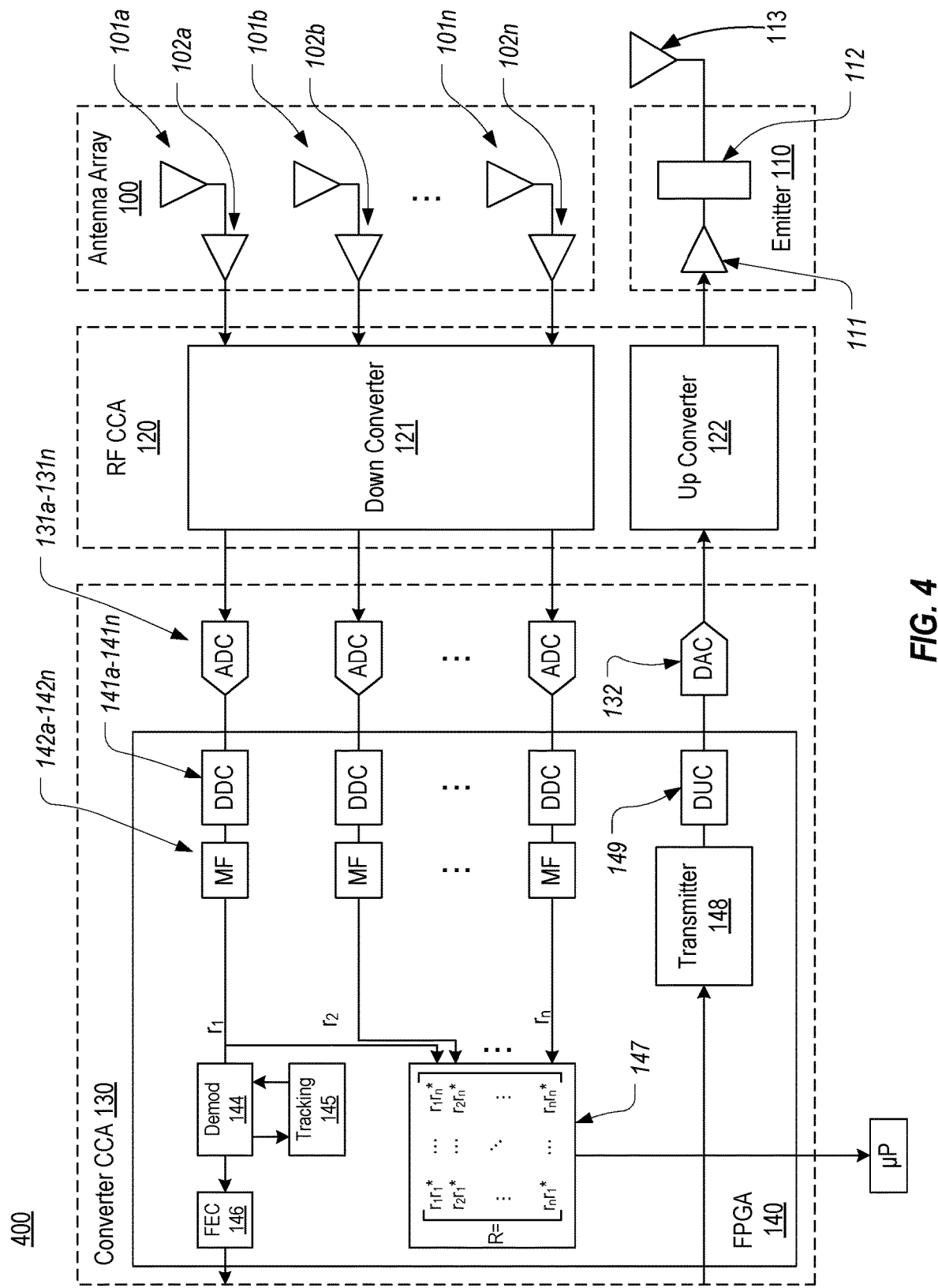
FIG. 4 provides a block diagram of another angle of arrival system that is configured in accordance with embodiments of the present invention.

FIG. 4 illustrates an alternate embodiment where an angle of arrival system 400 does not include despreaders 143a-143n and can therefore be employed when the received signal is a non-spread signal. In this embodiment, the modulated outputs $r_1$ through $r_n$ are provided directly to covariance matrix component 147 which identifies the differences in phase between each channel in the same manner as described above. In particular, covariance matrix component 147 calculates the relative phase differences between each signal without demodulating the signals to identify the actual phases of the signals.

As shown in FIG. 4, angle of arrival system 400 may still include demodulator 144, tracking loop 145 and FEC component 146 to allow data to be recovered from the received signal, but these components are optional and not required to detect the angle of arrival. Also, in some embodiments, angle of arrival system 100 can be configured to allow despreaders 143a-143n to be selectively bypassed when a non-spread signal is received such that the same hardware configuration can be employed to implement both the spread and non-spread scenarios. Although the non-spread configuration shown in FIG. 4 is suitable for angle of arrival purposes, the spread configuration of FIG. 1 may be preferable in many implementations because it provides robustness in the presence of multipath.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. A method, implemented by an angle of arrival system, for identifying an angle of arrival of a signal incident on an antenna array by employing phase differences between the signal when the signal is received at multiple antennas of the antenna array, the method comprising:
   processing the signal received at each of the multiple antennas of the antenna array through a corresponding channel, each channel including a despreader;
   in a first channel of the multiple channels, demodulating and tracking the corresponding signal to generate a synchronization signal which identifies the timing of symbols within the corresponding signal;
   providing the synchronization signal to the despreader in the first channel and to the despreader in each of the other channels to thereby cause each despreader in each of the multiple channels to synchronously despread the corresponding signal;
   generating a covariance matrix from the despread signals output from the despreaders; and
   calculating an angle of arrival of the signal using the covariance matrix.

2. The method of claim 1, wherein each of the other channels does not include a demodulator or a tracking loop to control the timing of the corresponding despreader.

3. The method of claim 1, wherein the multiple channels comprise at least four channels.

4. The method of claim 1, wherein each channel includes a matched filter that is configured to control the timing of the corresponding despreader.

5. The method of claim 4, wherein each channel includes a digital down converter.

6. The method of claim 5, wherein the despreader, the matched filter, and the digital down converter in each channel are implemented on an FPGA.

7. The method of claim 6, wherein each channel includes an analog to digital converter that converts the corresponding signal to digital samples and provides the digital samples to an input of the FPGA.

8. The method of claim 7, further comprising:
   capturing a series of digital samples from each channel;
   comparing the series of digital samples from one or more of the channels to the series of digital samples for each of the other channels to identify a relative delay between the respective channels; and
   modifying a delay applied to at least one of the channels to synchronize the signals that are provided to the despreaders.

9. The method of claim 8, wherein comparing the series of digital samples from one or more of the channels to the series of digital samples for each of the other channels comprises performing a cross correlation on the series of digital samples for each pair of channels.

10. The method of claim 8, wherein modifying a delay applied to at least one of the channels to synchronize the signals that are provided to the despreaders comprises one or both of:
    modifying a fine delay component at an I/O boundary of the FPGA; or
    modifying a course delay component implemented in the FPGA.

11. An angle of arrival system comprising:
    a first channel for processing a signal received at a first antenna in an antenna array, the first channel including a despreader, a demodulator, and a tracking loop, the tracking loop outputting a synchronization signal that identifies timing of symbols within the signal, the synchronization signal being provided to the despreader to control timing of the despreader;
    multiple additional channels for processing the signal received at each of multiple additional antennas in the antenna array, each additional channel including a despreader, the synchronization signal being provided to the despreader in each of the additional channels to control timing of the despreader; and
    a covariance matrix component configured to receive the despread signals output from the despreader in each of the channels and to generate phase differences between each pair of despread signals.

12. The angle of arrival system of claim 11, wherein each channel also includes a matched filter and a digital down converter.

13. The angle of arrival system of claim 12, further comprising:
    a cross correlation component that is configured to receive a series of samples of the signal from each channel and to perform a cross correlation on each series to identify a relative delay between the signals.

14. The angle of arrival system of claim 13, wherein each channel also includes a fine delay component and a course delay component, and wherein the cross correlation component is configured to adjust a delay applied by the fine delay component and the course delay component in each channel based on results of the cross correlation.

15. The angle of arrival system of claim 14, wherein each channel also includes an analog to digital converter, and the series of samples of the signal from each channel are obtained after the analog to digital converter.

16. The angle of arrival system of claim 11, wherein the covariance matrix component performs conjugate multiplication on each pair of despread signals.

17. The angle of arrival system of claim 11, further comprising:
   one or more processors that calculate an angle of arrival of the signal based on the phase differences output by the covariance matrix component and a known arrangement of the antennas in the antenna array.

18. An integrated circuit comprising:
   a first despreader and multiple additional despreaders, each despreader being configured to despread a signal that was received at a different antenna of an antenna array;
   a demodulator for demodulating the signal output by the first despreader;
   a tracking loop coupled to the demodulator, the tracking loop generating a synchronization signal which identifies timing of symbols within the signal processed by the first despreader; and
   a covariance matrix component that is configured to receive the signals output by each of the despreaders and to calculate phase differences between each pair of the signals;
   wherein the synchronization signal is provided to the first despreader and to each of the multiple additional despreaders to synchronize the timing at which each despreader despreads the corresponding signal.

19. The integrated circuit of claim 18, further comprising:
   a cross correlation component that is configured to retrieve a series of samples of the signal input to each despreader and to perform a cross correlation on pairs of the series to identify a relative delay between the corresponding signals; and
   a fine delay component and a course delay component for each of the despreaders, the cross correlation component being coupled to each of the fine delay components and the course delay components to adjust a delay caused by the fine delay components and the course delay components based on the cross correlation to thereby cause the signals to be synchronized when provided to the despreaders.

20. The integrated circuit of claim 19, further comprising:
   a matched filter and a digital down converter for each of the despreaders, the signal being processed by the matched filter and the digital down converter prior to being processed by the despreader.

21. A method, implemented by an angle of arrival system, for identifying an angle of arrival of a signal incident on an antenna array by employing phase differences between the signal when the signal is received at n antennas of the antenna array, the method comprising:
   processing the signal received at each of n antennas of the antenna array through a corresponding channel to produce n sequences of modulated samples;
   generating a covariance matrix from each set of corresponding modulated samples in the n sequences; and
   calculating an angle of arrival of the signal using the covariance matrix.

22. The method of claim 21, wherein calculating an angle of arrival of the signal using the covariance matrix comprises performing averaging on the covariance matrices generated over a period of time.

* * * * *